(12) United States Patent
Pasupuleti et al.

(10) Patent No.: US 8,589,736 B2
(45) Date of Patent: Nov. 19, 2013

(54) SYSTEM AND METHOD FOR AUTOMATIC TEST DATA GENERATION FOR RELATIONAL TESTING

(75) Inventors: Vijay Suman Pasupuleti, Pune (IN); Tukaram Muske, Pune (IN); Prasad Bokil, Pune (IN); Ulka Shrotri, Pune (IN); Venkatesh Ramanathan, Pune (IN); Priyanka Darke, Pune (IN)

(73) Assignee: Tata Consultancy Services Limited, Maharashtra (IN)

( * ) Notice: Subject to any disclaimer, the term of this patent is extended or adjusted under 35 U.S.C. 154(b) by 181 days.

(21) Appl. No.: 13/208,999

(22) Filed: Aug. 12, 2011

(65) Prior Publication Data
US 2013/0042145 A1    Feb. 14, 2013

(51) Int. Cl.
*G06F 11/00*    (2006.01)

(52) U.S. Cl.
USPC ........................................ 714/38.1; 717/126

(58) Field of Classification Search
USPC ........................................................ 714/38.1
See application file for complete search history.

(56) References Cited

U.S. PATENT DOCUMENTS

| | | | |
|---|---|---|---|
| 6,442,714 B1 * | 8/2002 | Griffin et al. | 714/46 |
| 7,849,448 B2 * | 12/2010 | Yunus et al. | 717/126 |
| 7,900,111 B1 * | 3/2011 | Kim et al. | 714/739 |
| 2001/0013119 A1 * | 8/2001 | Agarwal | 717/11 |
| 2005/0022168 A1 * | 1/2005 | Zhu et al. | 717/124 |
| 2008/0098361 A1 * | 4/2008 | Kumar et al. | 717/128 |
| 2009/0164931 A1 * | 6/2009 | Kemmerling | 715/771 |
| 2010/0175052 A1 * | 7/2010 | Prasad et al. | 717/128 |
| 2013/0014089 A1 * | 1/2013 | Precious et al. | 717/131 |

\* cited by examiner

*Primary Examiner* — Kamini Patel
(74) *Attorney, Agent, or Firm* — Oliff & Berridge, PLC

(57) ABSTRACT

An automated system and method for test data generation for software testing. The present application relates to management of software testing by generating test data automatically. Further the system and method generate test data automatically with respect to two coverage criteria Boundary Value Coverage (BVC) and Masking Boundary Value Coverage (MBVC) in the white-box setting.

9 Claims, 1 Drawing Sheet

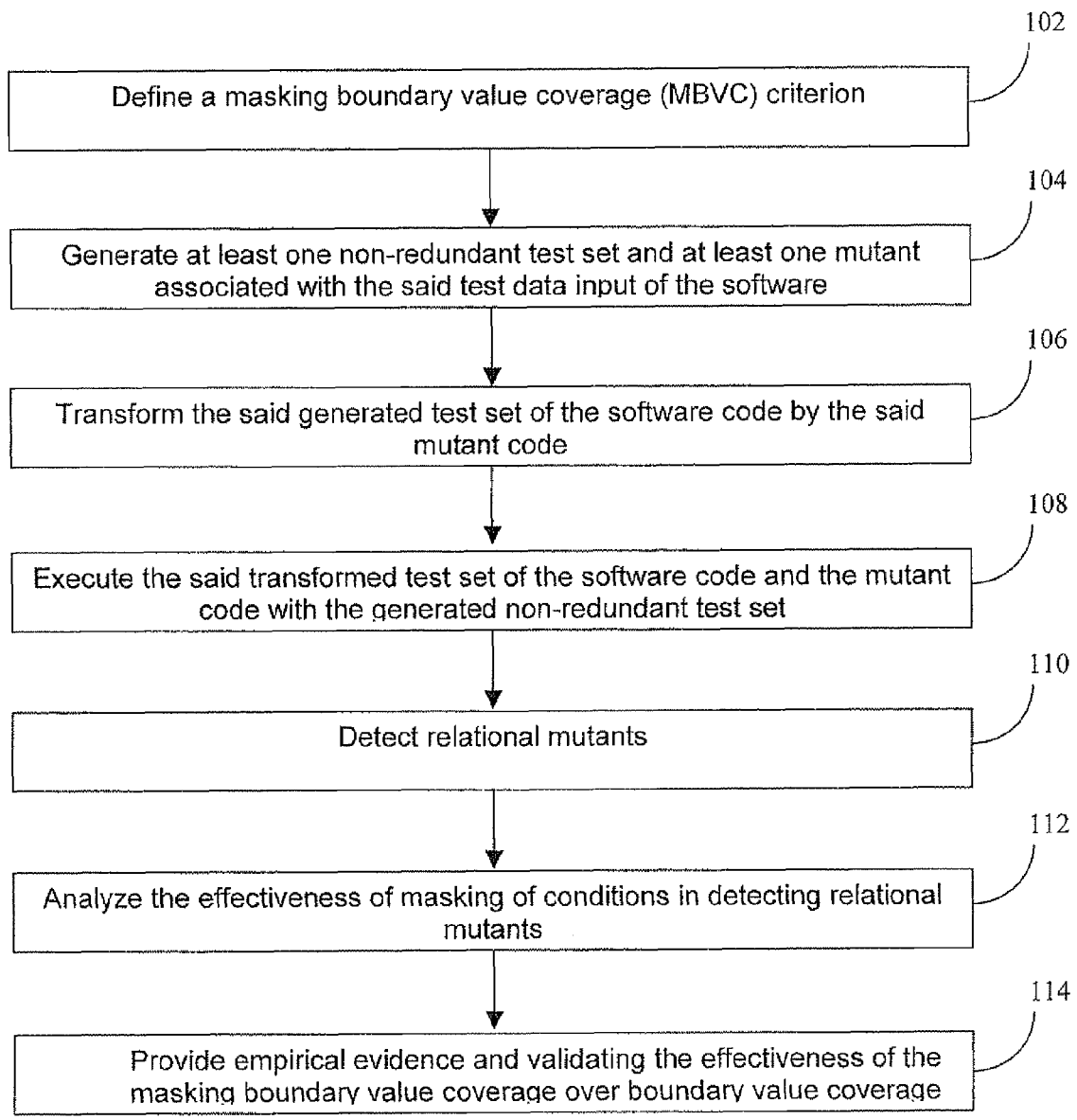

SYSTEM AND METHOD FOR AUTOMATIC TEST DATA GENERATION FOR RELATIONAL TESTING

FIELD OF THE INVENTION

The present application relates to generating test data automatically. More particularly, the application relates to a method for generating test data automatically with respect to two coverage criteria Boundary Value Coverage (BVC) and Masking Boundary Value Coverage (MBVC) in the white-box setting.

BACKGROUND

Bugs in software may turn very expensive and can result in loss of life in the case of safety-critical software, product recalls in the case of embedded software and loss to business in other cases. Ensuring that a software application is bug-free is very difficult. Formal specification and verification of the entire software of such systems could be one way of demonstrating that an application is bug-free. However formal specification of the complete software is often unavailable, and in many cases not derivable. Moreover, when the program is complex, formally showing its correctness is often intractable.

Today, software testing serves as a practical and economic alternative to detect bugs in software. Testing methods have been extensively studied in the literature. Testing typically assesses the end-to-end quality of software by exercising the software on a representative set of test set to check if it meets the specified requirements. However, it is impossible to check program performance on all possible input data. An ideal test set should be large enough to effectively exercise most of the program executions, yet small enough so that the tester can comfortably run the program on it and compare the actual outputs with the expected outputs.

Lots of efforts have been made to develop effective software analysis, verification and testing tools, but still generating effective test data efficiently is a challenging task. Test generation is usually done with respect to some coverage criterion. The coverage could be either functional coverage or structural coverage of the code. There are various types of structural coverage criteria [9] such as statement, condition, decision, condition/decision, modified condition/decision coverage (MC/DC), multiple condition coverage (MCC). Ensuring that a test set satisfies a coverage criterion is an indirect measure of its effectiveness of detecting bugs.

In order to test software for relational bugs it is desirable to generate test data automatically with respect to any of the two coverage criteria Boundary Value Coverage (BVC) and Masking Boundary Value Coverage (MBVC).

However, the existing approach to address this problem of software testing is at the best by guided simulation. Thus, the existing method and systems are not capable of testing software by generating test data automatically and precisely with respect to two coverage criteria Boundary Value Coverage (BVC) and Masking Boundary Value Coverage (MBVC) due to insufficiency to scale up to analyze the software.

It is observed that the prior art remarkably fails to disclose an efficient method and system for software testing by automatically generating test data for these two coverage criteria. The existing solutions generally are not capable of testing software by generating test data automatically with respect to two coverage criteria Boundary Value Coverage (BVC) and Masking Boundary Value Coverage (MBVC) due to technical insufficiency to test the software code.

SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

An objective is to provide a method and system for software testing by generating test data automatically.

Another objective is to provide a method and system for generating test data automatically with respect to two coverage criteria Boundary Value Coverage (BVC) and Masking Boundary Value Coverage (MBVC) in the white-box setting.

Another objective is to provide empirical evidence to the claim that Masking Boundary Value Coverage (MBVC) is relatively more effective than Boundary Value Coverage (BVC) using mutation analysis.

Yet another broad objective is to provide a method and system for software testing for defect detection in code, quality assurance of code and software program understanding.

In an embodiment, a realizable method and system is provided for generating test data automatically with respect to two coverage criteria boundary value coverage (BVC) and masking boundary value coverage (MBVC), wherein validating the effectiveness of the masking boundary value coverage (MBVC) over boundary value coverage (BVC) in detecting mutants in a software code is also done.

The present application provides a method for generating test data automatically with respect to two coverage criteria boundary value coverage (BVC) and masking boundary value coverage (MBVC), wherein the method includes generating at least one non-redundant test set and at least one relational mutant, transforming the said generated software code by the said mutant code, executing the said transformed software code and the mutant code with the generated non-redundant test set, analyzing the effectiveness of masking of conditions in detecting relational mutants, and providing empirical evidence and validating the relatively better effectiveness of the masking boundary value coverage (MBVC) over boundary value coverage (BVC).

The above said method and system are preferably for software testing by generating test data automatically with respect to two coverage criteria boundary value coverage (BVC) and masking boundary value coverage (MBVC), but also can be used for many other applications with appropriate modifications.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

FIG. 1 shows flow diagram of the process for automatic test data generation for software testing

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The present application enables a method and system for software testing by generating test data automatically. Particularly, the application enables a method and system for generating test data automatically with respect to two coverage criteria Boundary Value Coverage (BVC) and Masking Boundary Value Coverage (MBVC) in the white-box setting. Furthermore, the application enables a method and system for providing empirical evidence to the claim that Masking Boundary Value Coverage (MBVC) is relatively more effective than Boundary Value Coverage (BVC) using mutation analysis.

A realizable method for analysis of large code base is disclosed; the method comprises processor implemented steps of:

Referring to FIG. 1 is a flow diagram of the process for automatic test data generation for software testing.

The process starts at the step 102, a masking boundary value coverage (MBVC) criterion is defined in mathematical terms. At the step 104, at least one non-redundant test set and at least one mutant associated with the said test data input of the software is generated. At the step 106, the said generated test set of the software code is transformed by the said mutant code. At the step 108, the said transformed test set of the software code and the mutant code are executed with the generated non-redundant test set. At the step 110, relational mutants are detected. At the step 112, the effectiveness of masking of conditions in detecting relational mutants is analyzed. The process ends at the step 108, empirical evidence and validation is provided for the effectiveness of the masking boundary value coverage (MBVC) over boundary value coverage (BVC).

Boundary value analysis is traditionally a functional testing technique in which tests include boundary values of relational expressions. A test set covers the boundary values for a relational expression e relop c, where e is a constant if e evaluates to c, c+1 and c−1 for some test in the set. A test set is said to achieve Boundary Value Coverage (BVC) for a program if it covers every boundary value of every relational expression. Boundary Value Coverage (BVC) is useful for uncovering bugs in relational conditions where either an incorrect operator is used or there is an off-by-one error.

Relational expressions in a program often occur as part of a larger conditional expression or decision. In such cases a test case that covers a boundary value of the expression should ensure that the expression has an independent effect on the outcome of the larger conditional expression or decision. Masking of conditions, as introduced in the context of masking MC/DC, may be applied to achieve this independent effect. A condition c in a decision d is said to be masked if the values of the other conditions in d are such that changing the value of c will have no impact on the result of d.

In an embodiment, a coverage criterion called masking boundary value coverage (MBVC) is defined that extends boundary value coverage with masking. In MBVC each test set that covers a relational expression for boundary values also ensures that the values of other conditions in the decision are such that the relational expression of interest is the one that influences the outcome of the decision.

Consider the function func; the relational condition of interest is (inp1>10). The difference between the two test sets for BVC and MBVC will be in the value of inp2. The test set for MBVC will ensure that the value of inp2 is non-zero so that the relational expression has an independent effect, whereas the test set for BVC could have any value for inp2 including zero.

In an embodiment, Boundary Value Coverage (BVC) and Masking Boundary Value Coverage (MBVC) are formally defined. The input variables for func are inp1 and inp2, whereas op is the output variable.

Boundary Value Coverage (BVC): A relational condition in the programming language C is an expression using a relational operator (==, !=, <, >, <=, >=) to compare two entities. To test whether a relational condition is coded correctly, the recommended approach is to generate test data which exercise its boundary situations. The hypothesis is that boundary test cases find (1) off-by-one errors and (2) incorrect operator errors. An off-by-one error is an instance where one of the operands is either one less or one more than the intended. Any instance where the intended relational operator was replaced by another operator which is referred to as an incorrect operator error. A relational bug is the presence of either an off-by-one error or an incorrect operator error. Relational testing is testing intended to find relational bugs.

Consider the condition (inp1>10) of the function. The condition has an off-by-one error if the constant in the comparison should have been 9 or 11. To detect this bug, test set should be generated such that inp1 takes the values 10 and 11, respectively. Similarly, for the instances of incorrect operator errors to be found, test set should be generated such that inp1 takes the values 9 and 10. In other words, it is necessary to generate test set with inp1 taking values 9, 10 and 11 to detect all relational bugs.

Let r be a relational condition of the form $e_1 \sim e_2$ at program point p in a function $f(i_1, \ldots, i_n)$ where, ~is a relational operator and e1 and e2 are arbitrary integral expressions $i_1, \ldots, i_n$ are inputs to $f$ Definition 1 (BVC). A test set TS satisfies BVC for r iff there exist three test vectors $t_1, t_2, t_3 \in$ TS such that $e_1$ evaluates to $e_2-1$, $e_2$ and $e_2+1$ at p for $t_1, t_2$ and $t_3$ respectively. Each $t_i$ is a tuple of values $(v_i \ldots v_n)$ for the input variables $i_1 \ldots i_n$.

A test set that satisfies BVC for each relational condition in a function is said to provide boundary value coverage for that function. This definition can be similarly extended for a program.

It is noteworthy that the boundary value test set would not be sufficient to detect instances where both kinds of errors can occur simultaneously. For instance, the conditions (inp1>10) and (inp1==11), have uniform truth value for the three test set entries described above.

In an embodiment, when a relational expression occurs as part of a larger conditional expression, BVC may not be sufficient to detect relational bugs. To address this problem Masking Boundary Value Coverage (MBVC) is introduced, which adopts the idea of masking from masking MC/DC to BVC. Let d be a decision with several conditions in it and let r be one condition in it. If the test set generated is such that the value of r does not have an independent effect over the outcome of d, then the effect of r is not seen on the output either. To ensure this independent effect, other conditions in d should be masked while generating test set for r.

Let $r = e_1 \sim e_2$ be an atomic relational condition in a decision d at program point p in a function $f(i_1 \ldots i_n)$. Let d' represent the decision generated by replacing the condition r by r', and let $d_t$ represent the truth value of d at program point p with the test vector t.

Definition 2 Masking Boundary Value Coverage (MBVC): A test set TS satisfies MBVC for r iff there exist three test vectors $t_1, t_2, t_3 \in TS$, 1. $e_1$ evaluates to $e_2-1$, $e_2$ and $e_2+1$ respectively at p, for $t_1$, $t_2$ and $t_3$ respectively. Each $t_1$ is a tuple of values $(v_1 \ldots v_n)$ for the input variables $i_1 \ldots i_n$ and 2. for each $t_i$, $d^r{}_{ti} = \neg d^{\neg t}{}_{ti}$.

In an embodiment, a test set that satisfies MBVC for each relational condition in a function is said to provide masking boundary value coverage for that function. This definition can be similarly extended for a program. To ensure BVC for the condition (inp1>10), the test set should be such that this condition is exercised with inp1 taking the values 9,10 and 11. At the same time, to see the effect of a coding error on the output, it is necessary that inp2 takes a non-zero value in this test set. Claim: Test data generated for MBVC is more effective at detecting relational mutants than that generated for BVC.

In an embodiment, techniques based on observation such as mutation analysis is most suitable to compare different coverage criteria. Mutation analysis has been used in the past to determine test suite adequacy and also to compare test coverage criteria.

Mutation is a way of purposely modifying code of a function so as to change its external behavior. The modified function is called a mutant. Mutation operators define the way in which a particular programming construct gets modified. For instance, a mutation operator can be defined which replaces the operator in a randomly selected relational condition with a different one, Depending on which program unit is selected and how it is mutated different mutants of the same function can be created. For instance, if there are n relational operators in a function, there would be 5n possible mutants of this function with the above mutation operator. It is to be noted that it is working under the assumption that a mutant contains exactly one fault.

A test set is said to kill a mutant iff there exists a test data entry in the test set such that:

Both the original program and the mutant terminate on the test data, and

The output of the mutant is different from the output of the original program when run with this test data.

Note that a test data entry kills a mutant only if both the following conditions hold.

1. It causes different program states for the mutant and the original program (Weak Mutation).
2. This difference in state propagates to the output of the program.

The number of mutants killed by a test set is a measure of effectiveness of the test set. Mutation adequacy ratio represents this effectiveness. Formally—

Definition 3 (Mutation Adequacy Ratio). Let TS represent a test set, and let td represent a test set input. A mutant f' of the program f is said to be killed by a test set TS iff $\exists td \in TS$ such that the output of $f$ and $f'$ are not equal when run with the input td. The mutation adequacy ratio of a test set TS, $AM_F$ (TS), is the fraction of mutants killed by it in a given set of mutants F.

In an embodiment, for showing one possible mutant, the constant used in the relational condition is perturbed by one. Boundary Value Coverage (BVC) and Masking Boundary Value Coverage (MBVC) are both coverage criteria intended to find relational bugs and hence for the experiments utilizes a mutation operator that only changes operators and operands in relational expressions. Using such a restricted mutation operator as opposed to using a comprehensive set of mutation operators helps in greatly reducing the number of possible mutants to only those that are of direct interest to the coverage criteria under consideration.

Formally given a relational condition $e_1 \sim e_2$ the mutation operator is defined as:

$$\mu(e_1 \sim e_2) = \begin{cases} e_1 \sim' e_2 \text{ where } \sim' \neq \sim, \text{ or} \\ e_1 \sim e_2' \text{ where } e_2' \text{ is either } e_2 - 1 \text{ or} \\ \qquad e_2 + 1 \end{cases}$$

In an embodiment, a test set and mutant is generated. The invention automatically generates test set for either BVC or MBVC thus reducing the time and effort required to achieve coverage. The invention also attempts to generate a non-redundant test set by continuously performing an analysis of coverage that has already been achieved by the test set generated at each step and generating additional test data only for uncovered coverage units.

In an embodiment, the source program is transformed to include statements that generate nondeterministic values for input variables and add assert statements, the violation of which will result in a condition getting covered. To generate test set that violates these asserts the transformed program is analyzed using C Bounded Model Checker (CBMC). Given a C program and an assert statement, CBMC checks if the assert is valid and generates a trace that violates the assert if it is not valid.

C Bounded Model Checker (CBMC) is a SAT-based bounded model checker for programs written in Ansi-C and C++. Note that since property checking is un decidable in general, for some cases CBMC may not terminate or may run out of resources. For experiments, only those codes were considered for which C Bounded Model Checker (CBMC) terminates successfully for both Boundary Value Coverage (BVC) and Masking Boundary Value Coverage (MBVC).

In an embodiment, source code transformation is explained. A transformed code has been modified for generating values for input variables and for inserting asserts statements. First of all, it identifies the set of input variables needed in the function and then the code is modified such that input variables take non-deterministic values at the start of execution of the function. Any function whose name has the prefix "nondet_" is treated as a special function by CBMC. Let type be the data type of the return value of such a function. CBMC assumes that the return value of this particular function can be any valid value in the range defined by type. Hence, the instrumented code essentially communicate to CBMC that it has to check executions of func, wherein inp1 and inp2 can both be assigned any two independent values from the data type int.

The input code is also annotated with assert statements which are of the form assert (expr), where expr is any expression allowed by the Ansi-C syntax. To model check this assertion, CBMC tries to check whether there exists an assignment to the input variables, which causes the execution to satisfy (expr==0) when the corresponding line is reached. If so, the assertion is said to be violated, and CBMC reports the same along with a counter-example trace. The required test set is nothing but the values assigned to the input variables in the trace.

In an embodiment, when the annotated C code is given as input to CBMC, it produces a counter-example trace with 11 as the value for inp1 and 0 as the value for inp2. Asserts for Masking Boundary Value Coverage (MBVC): The test set for BVC is generated without considering the fact that inp2 is part of the same decision. As explained, one can use masking of conditions to overcome this limitation. To generate test set for Masking Boundary Value Coverage (MBVC), ensuring that inp2 takes a non-zero value in the entire test set. In order to achieve this, the code is further instrumented such that the assert statement is guarded by an appropriate if statement. The condition corresponding to this if statement is such that when the test set is generated, the effect of other conditions is masked.

When the annotated C code with above mentioned modification is given as input to CBMC, it produces a counter-example trace with 11 as the value for inp1 and 1 as the value for inp2.

In an embodiment, the mutation operator $\mu$ is implemented to generate mutants. It takes C source code as input and the mutant is generated by applying the mutation operator $\mu$ to each relational condition in the function. It also generates the main function which executes the mutated function on a given test set, and records the values of the output variables after each invocation.

In general, the number of possible mutants of a function can be quite large. However, the do fewer approach has been considered, by restricting to a particular mutation operator. The number of possible mutants of a function with n relational operators is only 7n using the mutation operator. Hence, the mutants of each function are generated exhaustively for the analysis. It is noteworthy that the mutation operator emulates the kind of erroneous functions intended to be detected by the test sets generated for both Boundary Value Coverage (BVC) and Masking Boundary Value Coverage (MBVC).

In an embodiment, the original code of the actual function and the mutant code are executed with the generated test set. Table 1 (on the left) shows the test set generated for Boundary Value Coverage (BVC) and it also shows the output of actual function and the mutant code. In this case it is an accident that the test data generator generated 0 for inp2. Table 1 (on the right) shows the test set generated for Masking Boundary Value Coverage (MBVC) and it also shows the output of actual function and the mutant code. It is easy to see that the mutant gets killed by test set for Masking Boundary Value Coverage (MBVC) but not by test set for Boundary Value Coverage (BVC).

TABLE 1

Test Data for Boundary Value Coverage (BVC) and Masking Boundary Value Coverage (MBVC).

| inp1 | inp2 | Function Output | Mutant Output |
|------|------|-----------------|---------------|
| 9    | 0    | 0               | 0             |
| 10   | 0    | 0               | 0             |
| 11   | 0    | 0               | 0             |
| 9    | 1    | 0               | 0             |
| 10   | 1    | 0               | 1             |
| 11   | 1    | 1               | 1             |

In an embodiment, a formal analysis is presented to show how masking of conditions helps in achieving additional effectiveness in detecting relational mutants. An arbitrary mutant is considered and a case-wise analysis on the basis of generatability of each type of test data is done.

Let $f$ be the function of interest, and let $f'$ be one of its mutants. Let r be the relational condition $e_1 \sim e_2$ in decision d, which was changed by $\mu$ and let r' represent the variant of r and d' the modified decision. Let b represent a boundary value which differentiates r from r', and let $T_b$ and $t_b$ respectively represent any Masking Boundary Value Coverage (MBVC) and Boundary Value Coverage (BVC) test data for coverage of b.

Case 1 Neither $T_b$ nor $t_b$ exist, The mutant cannot be detected by either of the test sets.

Case 2 $T_b$ exists, but not $t_b$. This contradicts the definition of Masking Boundary Value Coverage (MBVC), as any test data entry that satisfies Masking Boundary Value Coverage (MBVC), by definition satisfies Boundary Value Coverage (BVC).

Case 3 $t_b$ exists, but not $T_b$. If $t_b$ kills the mutant then since $f$ and $f'$ differ only in r, r=-r' and d=-d' must be true. Then $t_b$ also satisfies Masking Boundary Value Coverage (MBVC) for r which contradicts the assumption. Hence $t_b$ cannot kill the mutant.

Case 4 Both_b and $t_b$ exist.

$t_b$ kills f' and $T_b$ does not, An example of such a function is given to argue that this is a valid possibility, The commented code represents one possible application of $\mu$ to (inp1>10). For this example b=10. Table 2 shows two possible test data entries for this boundary value, one satisfying Masking Boundary Value Coverage (MBVC) and the other satisfying Boundary Value Coverage (BVC). This shows one possible instance where the mutant is killed by tb but not by $T_b$. Note that the same example can be used to show how $T_b$ kills a mutant that $t_b$ does not.

All the cases are in favour of MBVC, except Case 4(a). Note that Case 4(a) is an instance where the test data for MBVC could not ensure the second condition for mutant to be detected. However, since inp2 is a condition independent of the mutated condition, it is highly improbable that inp2 has different values in the two test data entries, especially when test data is generated automatically using a fixed algorithm. Furthermore, if the value of inp2 was same in the two test data entries, it cannot happen that BVC test data detects the mutant but MBVC test data does not. This argument is supported by the experimental data which contains no occurrences of scenarios similar to Case 4(a).

TABLE 2

Test Data.

| Coverage | inp1 | inp2 | Function Output | Mutant Output |
|----------|------|------|-----------------|---------------|
| MBVC     | 10   | 1    | 1               | 1             |
| BVC      | 10   | 0    | 0               | 1             |

In an embodiment, an experiment based on mutation analysis was conducted for. The experimental setup is described, and then the empirical data is presented.

To make the experiment more realistic some modules of an embedded application have been chosen. The application is a C program intended to control the battery in a car. The application has around 22 modules of which 12 have been chosen for analysis. Among the functions in these modules the number of functions which had logical combinations of relational conditions, and were amenable to the analysis was 74. The total number of lines of code for these 74 functions is 3646.

Let F represent the set of 74 functions were analyzed. The following steps were executed on each function $f$ in F.

Identify the set of output variables of $f$.

Generate test sets for $f$ satisfying Boundary Value Coverage (BVC) and Masking Boundary Value Coverage (MBVC).

Generate a random subset of all possible mutants of $f$.

Compile and execute each of the mutants on both the test sets, and record independently the number of mutants killed by each of them. In the setup, since the test sets are executed on the same set of mutants, the number of mutants killed as a direct measure of their mutation adequacy ratios was considered.

Empirical Data: Table 3 summarizes the empirical data collected from the mutation analysis. A description of the contents of various rows in the table is as follows:

The first row gives the total number of functions in the representative set. Note that only functions involving decisions with logical combination of relational conditions were considered.

The second row gives the number of functions for which Masking Boundary Value Coverage (MBVC) killed more mutants than Boundary Value Coverage (BVC).

The third row gives the number of functions for which Boundary Value Coverage (BVC) killed more mutants.

The fourth row gives the number of functions for which both Boundary Value Coverage (BVC) and Masking Boundary Value Coverage (MBVC) killed the same number of mutants.

The fifth row gives the total number of mutants generated using the mutation operator.

The sixth row gives the number of mutants killed by test data satisfying Masking Boundary Value Coverage (MBVC).

The seventh row gives the number of mutants killed by test data satisfying Boundary Value Coverage (BVC).

The rest of the rows are explained; a further (manual) investigation of why 893 of these mutants were not killed by any of the generated test data. There was time to analyze 153 of them, and it was revealed that 103 of these were not killed because the test data that can kill these mutants cannot be generated. For instance, the actual relational condition in a function was of the form b==1 whereas that in the mutant was b>=1. The boundary value that can kill this mutant is 2. But the variable b was a bit field of size 1. Extrapolating these numbers the total number of mutants that can be killed comes down to 4026. And hence the mutation adequacies of test data satisfying MBVC and BVC are 92.75% and 80.8% respectively. The rows 8, 9 and 10 in Table 3 quote these numbers.

TABLE 3

Empirical Data from Mutation Analysis.

| No. | Category | Number | Percentage |
| --- | --- | --- | --- |
| 1 | Representative Set | 74 | -NA- |
| 2 | $AM(TS_M) > AM(TS)$ | 42 | 56 |
| 3 | $AM(TS_M) < AM(TS)$ | 0 | 9 |
| 4 | $AM(TS_M) = AM(TS)$ | 32 | 44 |
| 5 | Total Mutants | 4627 | -NA- |
| 6 | Mutants killed by MBVC test data | 3734 | 80.7 |
| 7 | Mutants killed by BVC test data | 3253 | 70.3 |
| 8 | Number of Detectable Mutants (Extrapolated) | 4026 | -NA- |
| 9 | Mutants killed by MBVC test data | 3734 | 92.75 |
| 10 | Mutants killed by BVC test data | 3253 | 80.8 |

The reason for the other mutants not getting killed by test set satisfying Masking Boundary Value Coverage (MBVC) was that the change in state induced by the test data did not propagate to the output. This was because of masking by a condition in an independent decision. For instance consider a mutated version of the code, the boundary value for inp1 that can detect this mutant is 11. However, if the test values that were generated for inp1, inp2 and inp3 were 11, 1 and 1, the output of the mutated function does not differ from that of the original. Note that the change in state is observed, but this fails to propagate to the output due to the input variable inp3 taking the value 1. It is noteworthy that the condition inp3 is part of an entirely different decision.

Using masking for relational testing comes with the following added costs. For the functions wherein the conditions use logical operators.

The size of the test set for MBVC was 28.65% more than that for BVC. This happens mostly when there are more than one relational expression in a decision. In such cases the probability of a test vector generated for covering one component of a decision covering some other component also goes down in presence of masking. Hence more test vectors are required to provide Masking Boundary Value Coverage (MBVC).

The time taken to generate the test set for Masking Boundary Value Coverage (MBVC) was 9.38% more than that taken to generate for BVC. The average time taken for generating test data for Masking Boundary Value Coverage (MBVC) was 95.19 seconds per function, as opposed to 86.26 seconds per function for BVC. This was expected because the constraint that is generated by the model checker will be stronger when masking is used. Computing a satisfying assignment for this constraint is expected to be relatively expensive.

However, these costs should be acceptable as the probability of detecting a bug goes up considerably and although the time taken for Masking Boundary Value Coverage (MBVC) is more, the entire generation is automatic.

It is to be noted that when none of the conditions in the code is such that it is a logical combination of atomic conditions, masking has neither positive nor adverse effects.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A realizable method for generating test data with respect to two coverage criteria comprising a boundary value coverage (BVC) and a masking boundary value coverage (MBVC), wherein at least one test condition is characterized by validating an effectiveness of the MBVC over the BVC in detecting mutants in a test data input corresponding to a software code, the method comprising processor implemented steps of:
   generating at least one non-redundant test set and at least one mutant associated with the said test data input corresponding to the software;
   transforming the said generated test set of the software code by the said mutant code;
   executing the said transformed test set of the software code and the mutant code with the generated non-redundant test set;
   detecting relational mutants;
   analyzing the effectiveness of masking of conditions in detecting relational mutants; and
   providing empirical evidence and validating the effectiveness of the MBVC over BVC.

2. The method of claim 1, wherein the at least one non-redundant test set is generated by continuously performing an analysis of coverage that has already been achieved by the test set generated and generating additional test data only for uncovered coverage units.

3. The method of claim 1, wherein the said software code is transformed to include statements that generate at least one nondeterministic value for input variables and add assert statements, wherein a violation of which will result in a condition getting covered.

4. The method of claim 1, wherein the said software code is transformed for generating values for a set of input variables and for inserting assert statements.

5. The method of claim 4, wherein the said set of input variables are identified corresponding to a function and the software code is modified, thereby enabling input variables to be initialized with non-deterministic values at a starting point of execution of the function.

6. The method of claim 1, wherein a mutation operator is implemented for generating mutants and further introducing only off-by-one errors and relational operator errors in the code.

7. The method of claim 6, wherein the said implemented mutation operator takes software source code as an input and the mutant is generated by applying the mutation operator to each relational condition in the function.

8. The method of claim 1, wherein the said test set that satisfies masking boundary value coverage for each relational condition in a function is said to provide masking boundary value coverage for that function.

9. A realizable system for automatic generation of test data with respect to two coverage criteria comprising boundary value coverage (BVC) and masking boundary value coverage (MBVC), the system comprising:
- a processor; and
- a memory coupled to the processor, the processor being configured to execute program instructions stored in the memory in order to:
  - generate at least one non-redundant test set and at least one mutant associated with the said test data input of the software;
  - transform the said generated test set of the software code by the said mutant code;
  - execute the said transformed test set of the software code and the mutant code with the generate non-redundant test set;
  - detect relational mutants;
  - analyze the effectiveness of masking of conditions in detecting relational mutants; and
  - provide empirical evidence and validating the effectiveness of the masking boundary value coverage over boundary value coverage.

* * * * *